United States Patent
Porciatti (10) Patent No.: US 10,313,771 B2
(45) Date of Patent: Jun. 4, 2019

(54) LOUDSPEAKER MOUNTING SYSTEM

(71) Applicant: Silvio Porciatti, Pembroke, MA (US)

(72) Inventor: Silvio Porciatti, Pembroke, MA (US)

(73) Assignee: JLC-TECH IP, LLC, Weston, FL (US)

( * ) Notice: Subject to any disclaimer, the term of this patent is extended or adjusted under 35 U.S.C. 154(b) by 0 days.

(21) Appl. No.: 15/863,317

(22) Filed: Jan. 5, 2018

(65) Prior Publication Data

US 2018/0132021 A1     May 10, 2018

Related U.S. Application Data

(63) Continuation of application No. 15/177,157, filed on Jun. 8, 2016, now Pat. No. 9,883,267.

(60) Provisional application No. 62/174,403, filed on Jun. 11, 2015.

(51) Int. Cl.
| | |
|---|---|
| *H04R 1/02* | (2006.01) |
| *F16M 13/02* | (2006.01) |
| *E04B 9/00* | (2006.01) |
| *E04B 9/06* | (2006.01) |
| *E04B 9/24* | (2006.01) |

(52) U.S. Cl.
CPC ............. *H04R 1/025* (2013.01); *E04B 9/006* (2013.01); *E04B 9/064* (2013.01); *E04B 9/067* (2013.01); *E04B 9/241* (2013.01); *F16M 13/027* (2013.01); *H04R 1/028* (2013.01); *H04R 2201/021* (2013.01)

(58) Field of Classification Search
CPC ........ H04R 1/345; H04R 1/026; H04R 1/403; H04R 7/16; H04R 9/06; F21V 21/03; E04B 9/006; E04B 9/18; E04B 1/34321; E04B 2001/0061; E04B 9/04; E04B 9/225; E04B 9/241; E04B 9/245; F16M 13/027

See application file for complete search history.

(56) References Cited

U.S. PATENT DOCUMENTS

| | | | | |
|---|---|---|---|---|
| 4,126,971 A | * | 11/1978 | Macuga | E04B 9/006 248/214 |
| 4,330,691 A | * | 5/1982 | Gordon | H04R 1/02 181/144 |
| 7,621,497 B2 | * | 11/2009 | Wallace | E04B 9/006 248/228.2 |
| 2006/0045300 A1 | * | 3/2006 | Sterns | H04R 1/02 381/345 |
| 2011/0222270 A1 | * | 9/2011 | Porciatti | E04B 9/006 362/147 |
| 2015/0259909 A1 | * | 9/2015 | Wang | E04B 9/006 52/28 |

(Continued)

*Primary Examiner* — Mohammad K Islam
(74) *Attorney, Agent, or Firm* — Heisler & Associates (57) ABSTRACT

In a dropped ceiling assembly system elements are provided which include an elongate planar shelf held below an elongate spine. The shelf has lateral edges which can support edges of a ceiling tile resting thereon. This spine is configured to be held in position either adjacent to spines of other elements within a dropped ceiling or from above, such as by suspension wires passing through suspension holes in the spine. A compartment is provided on an underside of the shelf which is sized and shaped to receive and hold at least a portion of a loudspeaker therein. The loudspeaker mounting system is thus integrated into the shelf which also acts to hold ceiling tiles within a dropped ceiling.

13 Claims, 5 Drawing Sheets

(56) References Cited

U.S. PATENT DOCUMENTS

2018/0031217 A1\* 2/2018 Tuchler .................. F21S 8/026

\* cited by examiner

LOUDSPEAKER MOUNTING SYSTEM

CROSS-REFERENCE TO RELATED APPLICATIONS

This application is a continuation of U.S. patent application Ser. No. 15/177,157 filed on Jun. 8, 2016, which claims benefit under Title 35, United States Code § 119(e) of U.S. Provisional Application No. 62/174,403 filed on Jun. 11, 2015.

FIELD OF THE INVENTION

The following invention relates to brackets and other mounting systems for holding loudspeakers within a room where the loudspeakers are to operate. More particularly, this invention relates to mounting systems for mounting of loudspeakers from a ceiling of a room where the loudspeaker is to operate, and particularly ceilings which are of a suspended ceiling variety with elongate horizontal T-bar elements configured as a grid with ceiling tiles located in spaces of the grid, and which speaker mounting systems integrate into the T-bars of such a suspended ceiling grid.

BACKGROUND OF THE INVENTION

Ceilings of habitable structures, and especially office buildings often have a type of ceiling referred to as a "suspended ceiling." Such a suspended ceiling is suspended below a more rigid upper portion of a room by suspending a plurality of T-bars within a plane and then fitting ceiling tiles between these T-bars, typically by resting upon ledges extending laterally from the T-bars. The suspended ceiling beneficially hides HVAC equipment, cabling for telecommunications, wiring for power and other service conduits, ducts, etc. from the habitable space. The ceiling tiles also can provide some degree of insulation so that the space above the suspended ceiling does not need to be conditioned along with the rest of the habitable space. Access to the utility space above the suspended ceiling can easily be provided through the ceiling tiles by moving the ceiling tile out of the way, as the ceiling tiles typically are not fastened to the T-bars but only rest upon the ledges of the T-bars.

In one typical configuration the T-bars include long T-bars which can run parallel with each other and then short T-bars extending perpendicularly between the long T-bars to complete the grid. In one embodiment, these long T-bars are two feet apart so that the short T-bars are each two feet long. In other embodiments, the long T-bars can be further from each other (e.g. four feet apart or more).

Various structures benefit from being mounted within the suspended ceiling. For instance, lighting structures can have a two by two size or a two by four size and readily fit within a suspended ceiling between long T-bars and between short T-bars (removing one short T-bar to fit a two foot by four foot light). Furthermore, HVAC registers are often provided in a two foot by two foot size to fit where a ceiling tile is skipped. Further, public address systems and ambiance providing music systems are known to be mounted into the suspended ceiling between the T-bars, in the form of loudspeakers.

While suspended ceilings are successful in achieving the function described above, the standardization of ceiling tile sizes as well as lighting sizes, air conditioning register sizes and loud speaker sizes can cause a ceiling to be limited in the way that it can appear to a relatively small subset of appearances. An architect or other designer can select ceiling tiles having different textures or colors, or can select T-bars having different profiles to provide limited interest and uniqueness to an office space or other space having a suspended ceiling. However, the options are few. Furthermore, ceilings can take on a somewhat "cluttered" appearance when filled with lighting, HVAC registers and loudspeakers. In some instances it is desirable for the ceiling to be more uniform without as many different visual structures competing for the attention of a person in such a space. Finally, it is desirable to give architects and other designers options in the form of functional elements for suspended ceilings so that such architects or other designers can fully utilize their creative talent to design an optimal workspace or other environment within a building having a suspended ceiling.

SUMMARY OF THE INVENTION

With this invention a T-bar like system element is provided which includes a loudspeaker incorporated therein. By incorporating the loudspeaker into the T-bar itself, architects and other designers have an additional option when designing a ceiling for a particular space. Typically, the T-bar with included loudspeaker is provided as a two foot or four foot section (FIGS. 1 and 2), but other sizes could also be provided. In one embodiment only part of the length of the T-bar section is fitted with the speaker, such as half speaker and half plain with the speaker at an end or at a mid-portion, or with the speaker spanning less or more than half of the length of the T-bar section.

Long T-bars can be provided spaced four feet apart and then this four foot distance can be spanned by four foot long T-bars. Finally, if desired, two shorter foot T-bars can be provided between adjacent longer four foot T-bars to complete the square grid for suspended ceiling (or two foot T-bars can be left out so that the ceiling has a two foot by four foot grid pattern. Through a combination of two foot and four foot T-bar speaker system elements, as well as four foot T-bars with a two foot speaker (as an example), speaker patterns can be provided including single linear speakers, parallel lines of speakers, or squares or parts of squares or rectangles, each side fitted with speakers. Functionally, the speakers can thus be provided precisely where desired to provide the optimal sound distribution into the space beneath the suspended ceiling and ceiling tile aesthetics are undisturbed.

The T-bar with incorporated loudspeaker preferably has a substantially constant cross-sectional form so that it can be extruded and then fitted with the speaker element. In one embodiment, the T-bar is extruded aluminum. The T-bar could alternatively be formed by injection molding or other molding procedures, or be extruded from materials other than aluminum. The T-bar includes a spine. A speaker/sound system compartment is provided which is generally rectangular and provided beneath a shelf which extends laterally from a lower edge of the spine of the T-bar. This compartment can fit an elongate speaker which in one embodiment is in the form of a series of speakers arrayed along a line to fill the compartment, and in other embodiments is a speaker custom designed to have an elongate form.

The speakers can be configured to have both high and low frequencies provided thereby, or as an alternative only provide high, or perhaps high and mid frequencies, with lower frequencies provided from a separate speaker, potentially with such a low frequency speaker provided above the ceiling tiles as lower frequencies travel through intervening structures more effectively than high frequencies in many instances. A compartment is provided with side walls that are parallel and oriented spaced horizontally from each other.

A capture groove near a lower edge of each side wall is provided which can capture a grill. This grill acts as a cover for the speaker/sound system compartment which allows sound to readily pass therethrough. The grill could be a thin sheet of metal with holes therein, or could be a fabric screen to hide the loudspeakers within the speakers/sound system compartment. This compartment could have various different widths to accommodate different speaker sizes. In one embodiment, the lower surface of the ceiling tiles and the grill can be provided in a common plane and with a similar appearance, and with the tiles fitting sufficiently tightly between adjacent T-bars so that the ceiling can be provided in a visual appearance which appears to be uninterrupted.

As an option, the extruded structure can be provided with or without ribs extending vertically up from the shelves of the T-bar with outermost ones of the ribs higher than other ribs extending up from the shelves. In this way, a gap is provided for air circulation between the various ribs extending up from the shelves. Furthermore, an upper portion of the spine can optionally include heat transfer fins extending laterally therefrom. These ribs and fins act together to help dissipate heat away from the speaker/sound system compartment, so that heat generated by the speaker can be readily dissipated to provide optimal performance for the speaker. Furthermore, heat generated by the speaker does not end up passing into the conditioned space below the suspended ceiling, but rather is transferred with air in the space above the suspended ceiling so that heat generated by the speaker/sound system does not need to be removed by the HVAC system.

Wiring for the sound system can be routed up through the shelf in the T-bar like system element and then up into the space above the suspended ceiling for wiring into other portions of the sound system, such as an amplifier, separate bass speakers, and a sound source, such as an MP3 player, CD player, radio tuner, or other original sound source.

OBJECTS OF THE INVENTION

Accordingly, a primary object of the present invention is to provide a loudspeaker mounting system which allows speakers to be integrated into a "suspended ceiling" of a space to be provided with a sound system.

Another object of the present invention is to provide a loudspeaker mounting system which is integrated largely into existing ceiling elements in an unobtrusive manner.

Another object of the present invention is to provide a loudspeaker mounting system which gives architects and other designers further flexibility in designing the appearance of a space which is desired to have a sound system therein.

Another object of the present invention is to provide a method for mounting a speaker from a ceiling which integrates with T-bars of a suspended ceiling.

Other further objects of the present invention will become apparent from a careful reading of the included drawing figures, the claims and detailed description of the invention.

DESCRIPTION OF THE PREFERRED EMBODIMENT

Referring to the drawings, wherein like reference numerals represent like parts throughout the various drawing figures, reference numeral 10 is directed to a system for mounting a speaker S into a ceiling assembly 100, such as a suspended ceiling with ceiling tiles C located in spaces in a grid of T-bars or similar system 10 elements. The system 10 provides elongate elements which also function as T-bars within the ceiling assembly 100 and include a compartment 30 for supporting at least a portion of a speaker S therein, and preferably the entire speaker S contained within this compartment 30.

In essence, and with particular reference to FIGS. 1-5, basic details of the system 10 are described, according to a preferred embodiment. The system 10 provides elements within a ceiling assembly 100 which can come in a smaller size system embodiment 10, or a longer embodiment 110 (FIG. 2) or a hybrid/half embodiment 120 (FIG. 3) where the shortened compartment 125 is shorter than the length of the overall T-bar like hybrid embodiment element 120. Each system 10 element includes an elongate planar shelf 20 extending between opposing ends. A spine 40 extends up from the shelf 20, so that the spine 40 and shelf 20 together have a T-bar like form. A compartment 30 is provided beneath the shelf 20. This compartment 30 is configured so that it can contain at least a portion of a speaker S therein, and most preferably contain the entire speaker S therein. The compartment 30 has an elongate form similar to that of the shelf 20 (except in the half embodiment 120 where the compartment 30 has a length approximately half that of the shelf 20). Connectors 50 are provided at opposite ends 44 of the spine 40 to facilitate interconnection of separate system 10, 110, 120 elements together to form the grid structure of a ceiling assembly 100 for supporting of ceiling tiles C in spaces therein.

Figure 4:
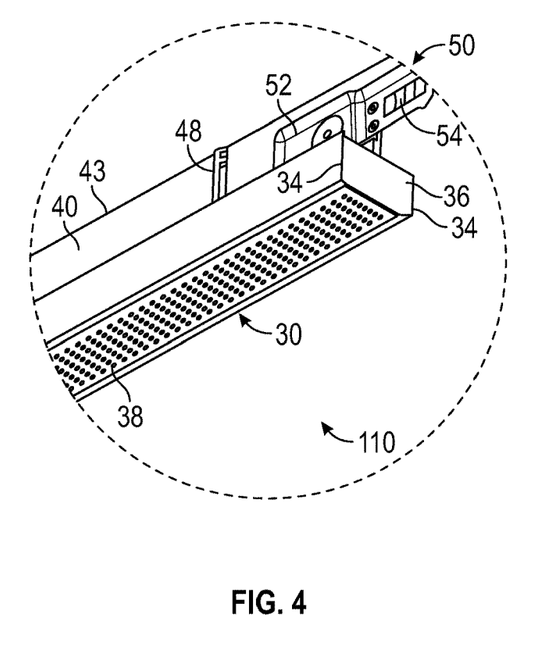
FIG. 4 is a perspective view of a detail of a portion of that which is shown in FIGS. 1 and 2, revealing details of a speaker compartment and connector.
Figure 5:
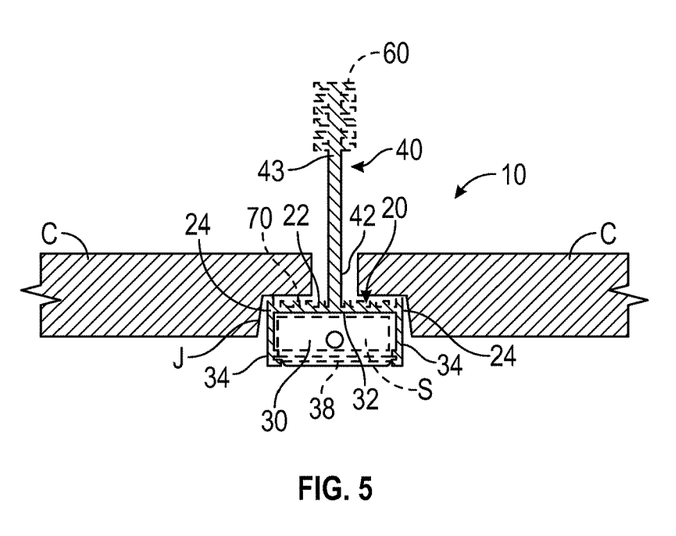
FIG. 5 is an end elevation full sectional view of that which is shown in FIGS. 1 and 2 and with ceiling tiles resting on the shelf thereof according to one embodiment of this invention.

More specifically, and with particular reference to FIGS. 4 and 5, details of the shelf 20 of the system 10 are described, according to a preferred embodiment. The shelf 20 is preferably formed as one part of an extrusion along with the spine 40 (and preferably also the compartment 30), with the shelf 20 and spine 40 formed from a common unitary mass of material, most typically aluminum. The shelf 20 could be formed of other materials besides aluminum and could be formed from other manufacturing processes either separate from the spine 40 or along with the spine 40. For instance, the shelf 20 could be formed of an injection molded or extruded plastic material or could be formed by bending of sheets of material such as a thin sheet of steel, bent to have the desired finished form of the shelf 20 alone or shelf 20 and spine 40 together.

Figure 6:
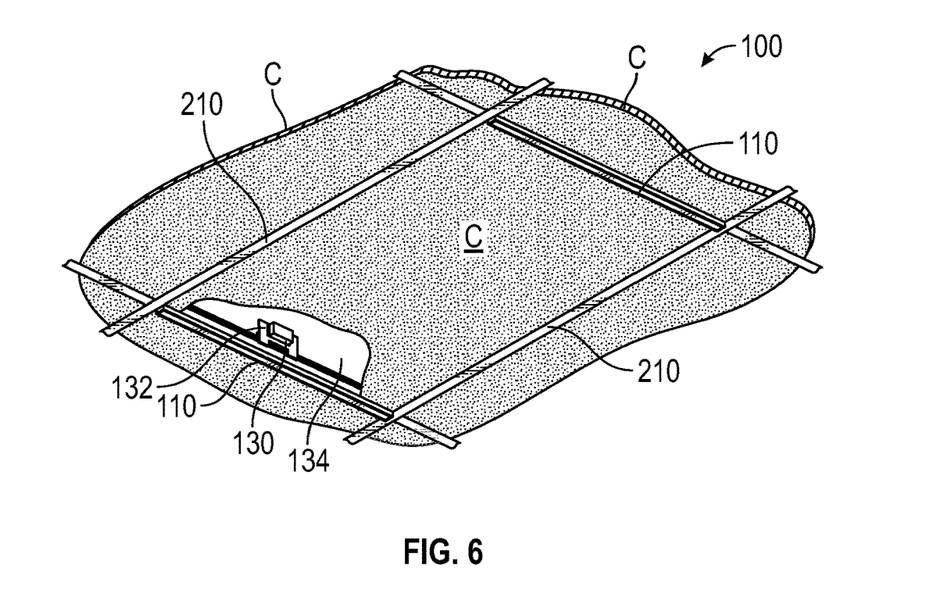
FIG. 6 is a perspective view from below of a dropped ceiling incorporating the loudspeaker mounting system of this invention, and with portions of a ceiling tile thereof cut away to reveal further details of the overall assembly.
Figure 7:
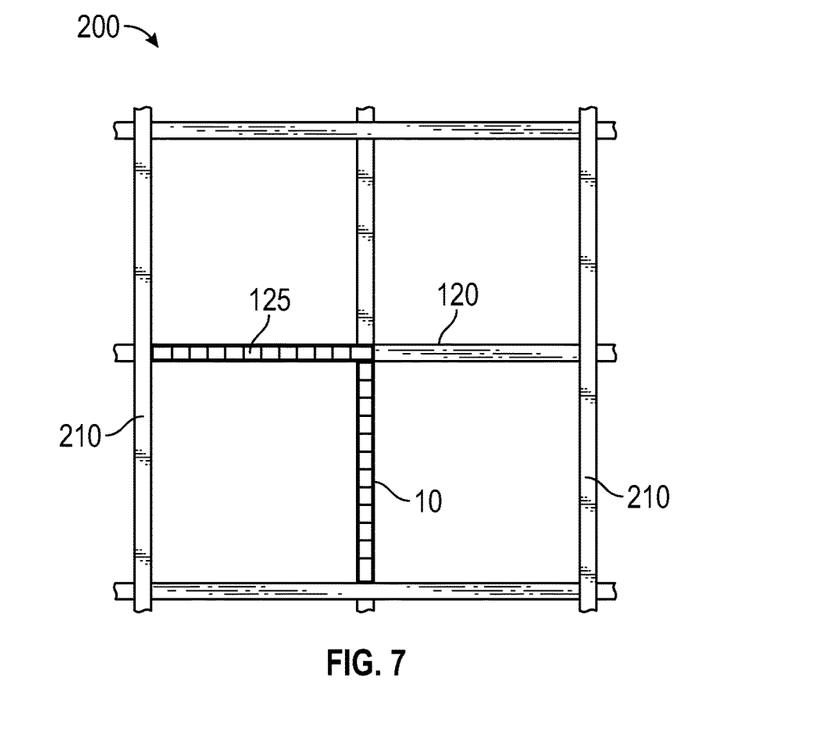
FIG. 7 is a bottom plan view of a further alternative T-bar grid utilizing long T-bars such as those shown in FIG. 2, short T-bars such as those shown in FIG. 1 and hybrid T-bars such as that shown in FIG. 3 together into a dropped ceiling in one implementation of the system and method of this invention.

The shelf 20 preferably has a constant cross-sectional form which is substantially planar and horizontal when installed as part of a dropped ceiling assembly 100 (FIGS. 6 and 7). The shelf 20 includes a planar top surface 22 which is bounded by lateral edges 24 on either side of this top surface 22. Opposing ends 26 of the shelf 20 define an overall length for the shelf 20.

Figure 1:
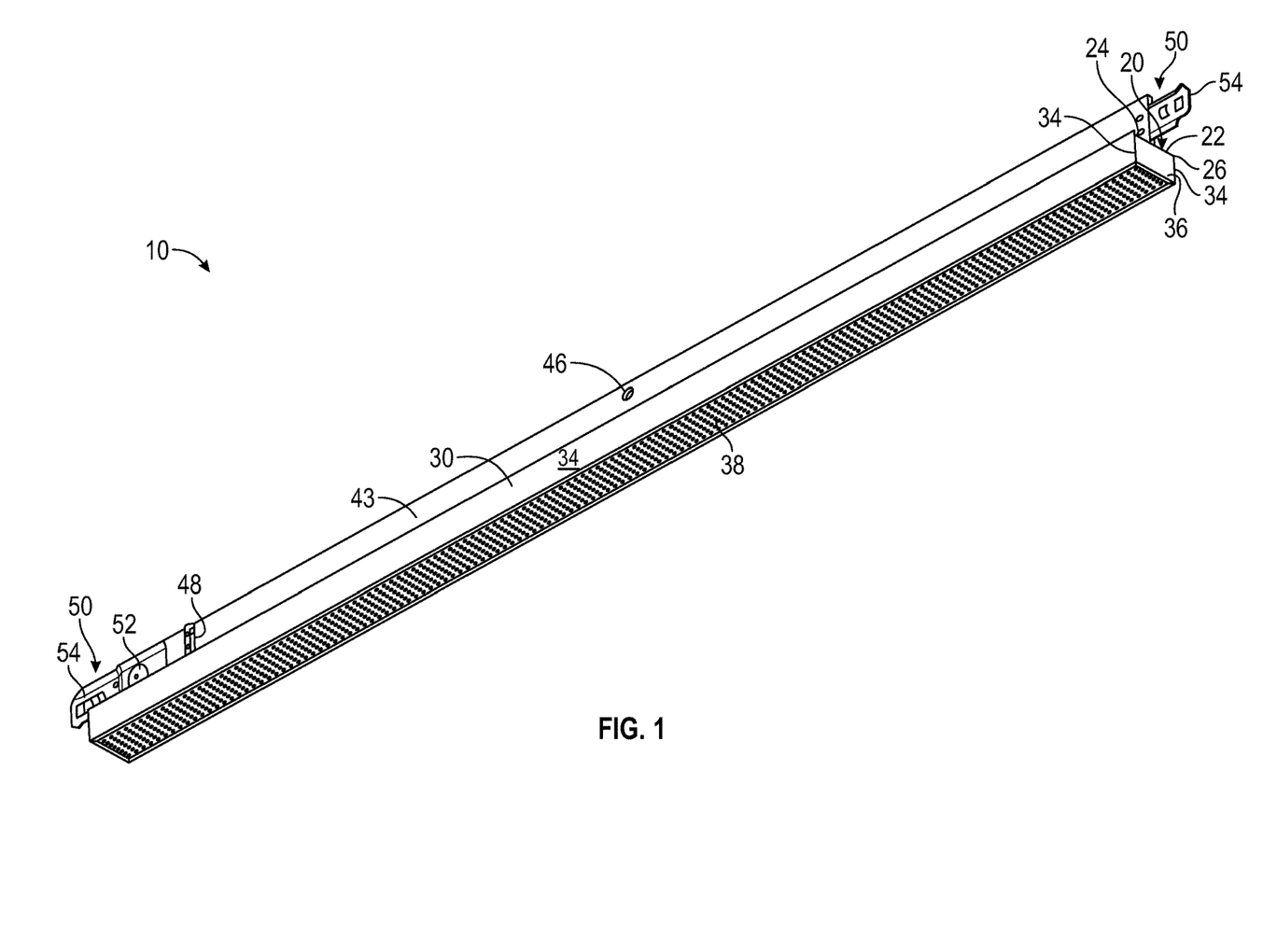
FIG. 1 is a perspective view of a system generally in the form of a T-bar of a dropped ceiling which includes a compartment for mounting of at least one speaker of a sound system for integration into a dropped ceiling according to this invention.

In the embodiment depicted in FIG. 1, the distance between these opposing ends 26 is approximately half of a length of the long embodiment 110. As a typical example, the distance between the opposing ends 26 could be two feet with the long embodiment 110 having a distance between opposing ends 26 being four feet. Other appropriate measurements might include sixty centimeters for the shorter embodiment (FIG. 1) and one hundred twenty centimeters for the long embodiment 110. With the half embodiment 120 (FIG. 3) the shelf 20 has a length and configuration similar to that of the long embodiment 110. However, the shortened compartment 125 is half size with a size similar to that of the compartment 30 provided with the short embodiment shelf 20 (FIG. 1).

The top surface 22 of the shelf 20 is preferably bisected by the spine 40 joining to the shelf 20 at a midpoint thereof. A width of the shelf 20 between the lateral edges 24 is such that when the spine 40 divides the top surface 22 into two portions each portion is still sufficiently large to securely hold an edge of a ceiling tile C resting thereon. In a simplest embodiment, the ceiling tiles C have rectangular edges which merely rest upon the top surface 22 of the shelf 20. In the embodiment particularly shown in FIG. 5 the edges of the ceiling tiles C are notched to provide a lap joint J at the edge of the ceiling tile C. This allows the ceiling tile C to rest with a lower surface of the ceiling tile C a little bit lower than it would otherwise rest, and help the compartment 30 to be hidden somewhat by the ceiling tiles C. This effect can be further increased by providing ceiling tiles C which are thicker or with an asymmetrical joint J that still has sufficient material to support the weight of the ceiling tile C by resting upon the shelf 20, but extend down to hide a greater portion or all of sides of the compartment 30.

Furthermore, and particularly with speakers S which dissipate power directly at the compartment 30, heat transfer fins can optionally be provided extending up from an upper surface of the shelf 20 to assist in dissipating heat generated within the compartment 30 by operation of the speakers S therein. Where such heat transfer fins are supplied, most preferably they extend parallel with each other and vertically a similar height, except that fins at extreme edges extending up from the lateral edges 24 of the top surface 22 of the shelf 20 are preferably slightly higher to facilitate air circulation to access gaps between all of the heat transfer fins and for maximum heat transfer effectiveness. It is worth noting that the heated air coming off of these heat transfer fins is not located within the space beneath the ceiling tiles, but rather is in a space above the ceiling tiles C. Thus, load on air conditioning within a space below the ceiling tiles C is not increased by heat generated by the speakers S, but rather this heat is effectively routed to the space above the ceiling tiles C and outside of the air conditioned space beneath the ceiling tiles C.

With particular reference to FIGS. 1-5, details of the compartment 30, 125 for containing the speakers S are described. The compartment 30 is located beneath the shelf 20. In a preferred embodiment the compartment 30 is formed as a common extrusion along with the shelf 20 and spine 40. Alternatively, the compartment 30 can merely be attached to the shelf 20, preferably in a permanent fashion, but alternatively with removable fasteners, such as screws or with other fasteners such as rivets, or through a welding procedure.

The compartment 30 can have any of a variety of different geometric configurations in various different widths in various embodiments of this invention. Most preferably, and as depicted in FIGS. 1-5, the compartment 30 has a constant cross-sectional form with a width similar to a width of the shelf 20 from which the compartment 30 extends downwardly. The compartment 30 has a width defined by side walls 34 which are preferably parallel and spaced from each other with the compartment 30 therebetween.

An upper surface 32 of the compartment 30 is defined by a lower portion of the shelf 20. End walls 36 are provided at ends of the compartment 30 defining an overall length of the compartment 30 and which are preferably adjacent to the opposing ends 26 of the shelf 20 (except with the half embodiment 120 (FIG. 3) where the end walls 36 include one end wall at a midpoint of the adjacent shelf 20).

A grille 38 preferably encloses the compartment 30 at least partially by spanning between lower tips of the side walls 34. This grille 38 could attach in a variety of different ways. In one embodiment the tips of the side walls 34 include a groove extending horizontally and inwardly. The grille 38 can snap into this groove to be held adjacent the tips of the side walls 34. The grille 38 can have any of a variety of different forms.

In one embodiment the grille 38 has a fabric-like form. In other embodiments the grille 38 is a sheet of metal or plastic or other material which is substantially rigid and includes a series of small holes therein. The grille 38 is preferably removably attachable to the side walls 34 to facilitate installation of speakers S into the compartment 30, and then with the grille 38 closing off the compartment 30 and tending to keep the speakers S clean and protected from damage.

With continuing reference to FIGS. 4 and 5, details of the spine 40 are described, according to this preferred embodiment. The spine 40 is preferably formed along with the shelf 20 as a common extrusion. As an alternative, the spine 40 could be formed separately and then joined to the shelf 20, such as through utilizing fasteners. The spine 40 is preferably formed of a material similar to that of the shelf 20 but could be formed of some different material if desired. The spine 40 preferably has a continuous form which is planar and elongate between opposite ends 44 defining an overall length of the spine 40 being similar to an overall length of the shelf 20.

The spine 40 includes a lower edge 42 which carries the shelf 20 thereto, and most preferably is formed as a unitary mass with the spine 40 joined to the shelf 20 at this lower edge 42 of the spine 40. An upper edge 43 is provided opposite the lower edge 42. This upper edge 43 can be fitted with further heat transfer fins if desired to further augment heat transfer away from speakers S within the compartment 30 (or such fins can be provided alone without the fins on the shelf 20).

Figure 2:
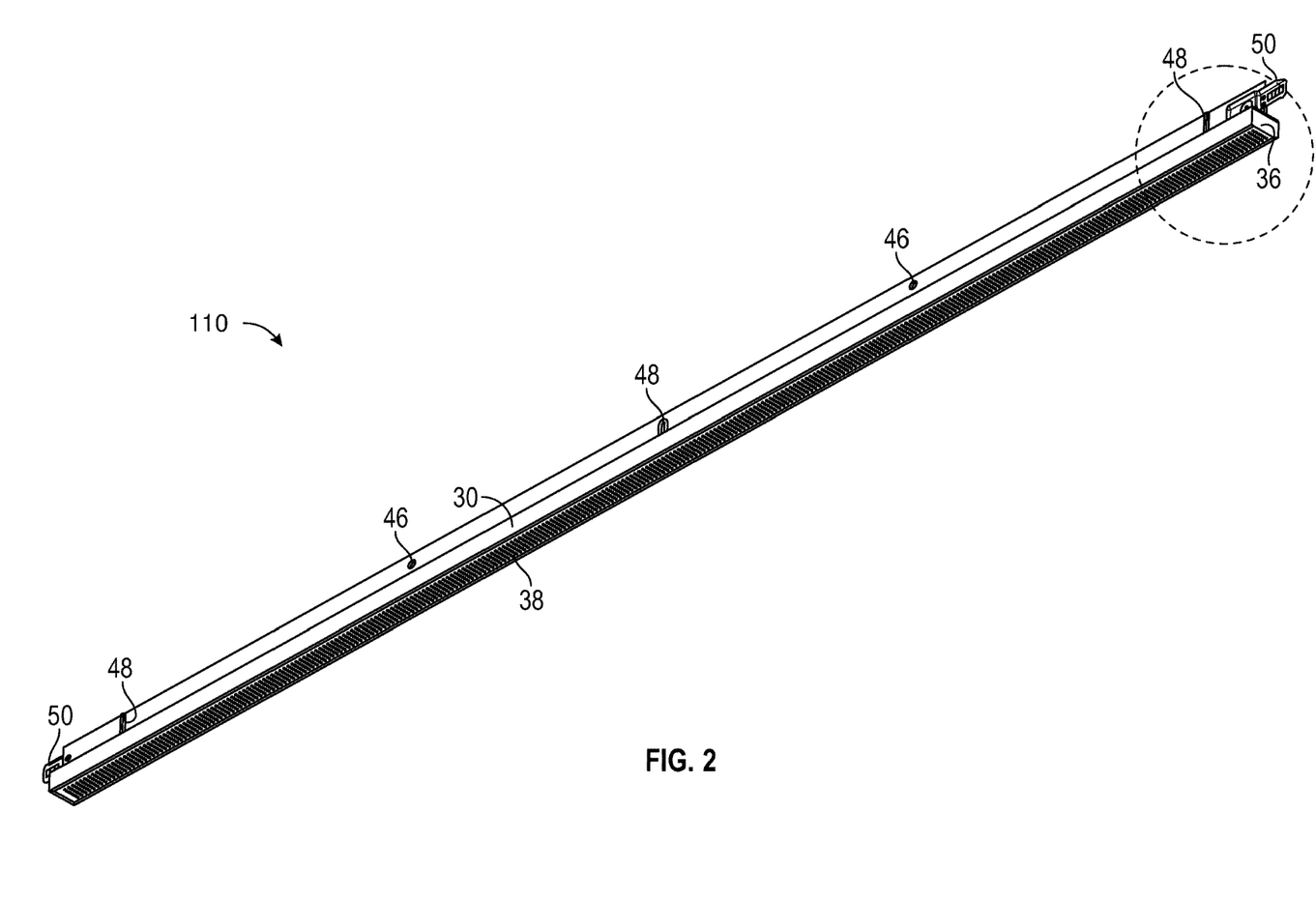
FIG. 2 is a perspective view of a variation on that which is shown in FIG. 1 with a longer form.
Figure 3:
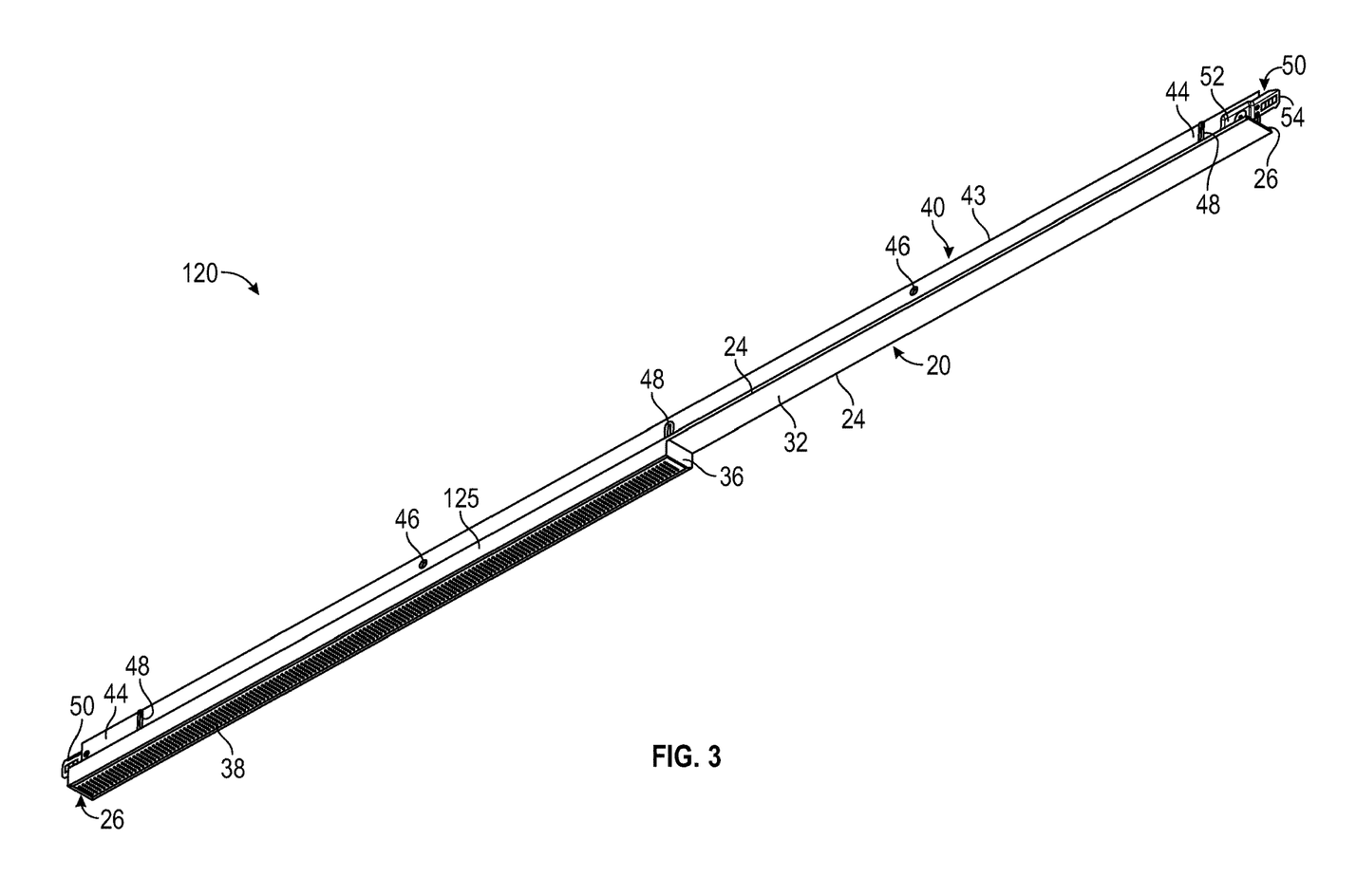
FIG. 3 is a perspective view of a further variation of that which is shown in FIGS. 1 and 2, with a long form for a shelf and spine of the T-bar shown therein but with a smaller size for a speaker containing compartment thereof.

The spine 40 also preferably includes suspension holes 46 periodically passing therethrough along with interconnection slots 48, with the interconnection slots 48 most preferably provided near each end 44 of the spine 40 and at a midpoint of the spine 40 (particularly for the long embodiment 110 of FIG. 2). The suspension holes 46 are typically utilized with wire routing therethrough and the wire anchored above the suspended ceiling area, so that the grid of T-bar like system 10 elements are suspended at a desired height above a space where the dropped ceiling is located. The suspension holes 46 provide that point at which this grid of system 10 elements are positioned.

The interconnect slots 48 preferably extend vertically and have a height similar to a height of the connectors 50 to join adjacent spines 40 together within a grid of the ceiling assembly 100. The connectors 50 are preferably in the form of generally rectangular rigid elements which have a base 52 opposite a tip 54. The base 52 is attached to one of the opposite ends 44 of the spine 40 and has the tip 54 extending horizontally away from the spine 40 past the end 44 to which the connector 50 is attached. This tip 54 can have a hook-like tooth extending downward from a tip thereof for more secure holding within an interconnect slot 48, or can have merely a rectangular form to allow it to slip into one of the interconnect slots 48. The connectors 50 thus hold ends 44 of one spine 40 within interconnect slots 48 of other spines 40.

Utilizing system 10 elements of either the short embodiment 10 (FIG. 1) or the long embodiment 110 (FIG. 2) or the half embodiment 120 (FIG. 3) can allow an overall ceiling assembly 100 along with ceiling tiles C to be formed, or an alternate ceiling assembly 200 (FIG. 7). In particular, a typical ceiling assembly 100, 200 includes long T-bar elements 210 which will often span between walls of a room or as far as a T-bar maximum length can conveniently be provided. These long T-bar elements 210 are typically spaced apart by a standard spacing distance such as every four feet. Long embodiment 110 system elements can then span perpendicularly between these longest T-bar elements 210. While it is conceivable that such longest T-bar elements 210 could have a compartment 30 therein for speakers S, most typically these longest T-bar elements are positioned where speakers S are not to be provided and merely provides structural support for the dropped ceiling assembly 100, 200.

Either plain four foot T-bar elements can span between the longest T-bar elements 210 or the long embodiment 110 system elements can span between these longest T-bar elements 210. Typically, such long embodiment 110 system elements or four foot long T-bars are placed every two feet between the longest T-bar elements 210. This results in spaces which are two feet by four feet which can have similarly sized ceiling tiles C placed therein. As an alternative, the short embodiment system 10 elements can be provided parallel to the longest T-bar elements 210 and spanning between the long embodiment 110 system elements or four foot plain T-bar elements spanning between the longest T-bar elements 210. Also plain two foot T-bars can similarly be provided in this parallel orientation between adjacent longest T-bar elements 210.

A resulting two foot by two foot space is provided for similarly sized ceiling tiles C to fit therein. In such an arrangement, it can be seen that there is a benefit to providing the half embodiment 110 system element which has a shortened compartment 125 on a portion thereof and with the remaining portion of the half embodiment 110 system element having a configuration similar to that of a plain T-bar with a shelf 20 and spine 40 but without any compartment 30. Accordingly, in such ceiling assemblies 100 and alternate ceiling assemblies 200 compartments 30 for speakers S can be provided at any location other than as part of the longest T-bar elements 210.

In other ceiling assemblies, and recognizing that each T-bar type element can be suspended independently from suspension holes 46 associated therewith, it is not required that longest T-bar elements 210 be provided, but rather an entire suspended ceiling can be provided from shorter T-bar type elements. It is conceivable that every shelf of every T-bar within a dropped ceiling could have a compartment 30 therein. Speakers S could then be provided everywhere within the suspended ceiling, rather than only in select locations. It is also conceivable that while the compartments 30 would be located everywhere, that the speakers S would be concentrated only in certain locations where sound is desired to be emitted. Thus, a ceiling of uniform appearance can be provided but with speakers S only at certain locations therein.

In a typical installation, speakers S would be provided within the compartments 30 entirely (as a potential alternative, the speakers could extend down from the compartment 30 somewhat so that the compartment 30 merely acts as containment for a portion of the speakers S and/or to provide mounting for the speakers S). The upper surface 32 and side walls 34 can be appropriately modified to facilitate mounting of speakers S therein. Such modification will typically involve at least one hole passing through the shelf 20 to allow for wiring and cabling to the speaker S within the compartment 30 to provide power and/or sound signal to the speaker S.

This cabling 134 can be routed all the way back to a centralized amplifier sound and power source. As an alternative, such amplification and sound source componetry can be distributed throughout the ceiling assembly 100, such as with power/signal supply modules 130 included on a bracket 132 which can mount to the upper edge 43 or otherwise to the spine 40 (FIG. 6) and with cabling 134 routed to such a power/signal supply 130, and then supplying power into the speakers S within the compartment 30 of each system 10 element. Such a power/signal supply 130 could be provided on each spine 40 for appropriately powering the speakers S within the compartment 30 associated with the spine 40, or only certain spines 40 of certain system 10 elements would be provided with such a power/signal supply 130 to supply power and signal to a region of speakers S within compartments 30 of adjacent system 10 elements.

A room having the suspended ceiling could have speakers S therein all powered with the same signal or different regions within the room could receive different sound signals. Differentiating the sound signals could include merely volume control but with the same sound signal or could include different sound signals so that sound appropriate for each region within the room can be provided.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A system for mounting a T-bar with a speaker from a ceiling, the system comprising:
    an elongated spine extending from a first terminal end to a second terminal end, the elongated spine being a thin planar structure with a longitudinal edge extending between the first and second terminal ends;
    a planar shelf spaced from the longitudinal edge of the elongated spine extending to both lateral sides of the elongated spine, wherein the planar shelf is positioned so that at least one ceiling tile may rest upon each lateral side of the planar shelf extending from the elongated spine;
    a plurality of connectors, each connector located at each terminal end of the elongated spine and connectable to either a second T-bar with a speaker or a common T-bar used for a suspended ceiling frame; and
    a compartment, the compartment located on a bottom side of the planar shelf and containing at least one speaker such that at least a portion of the at least one speaker is positioned below the at least one suspended ceiling tile resting upon the planar shelf.

2. The system for mounting the T-bar with speaker of claim 1, further comprising a power source and an amplifier connected to the at least one speaker.

3. The system for mounting the T-bar with speaker of claim 2, wherein the power source and amplifier are located remote from the T-bar with speaker and connected to the at least one speaker by cabling.

4. The system for mounting the T-bar with speaker of claim 2, wherein the power source and amplifier are attached to the elongated spine through use of a bracket, the power source and amplifier connected to the at least one speaker by cabling.

5. The system for mounting the T-bar with speaker of claim 1, further comprising an upper heat sink formed adjacent to the longitudinal edge of the elongated spine.

6. The system for mounting the T-bar with speaker of claim 5, wherein the upper heat sink comprises at least one fin protruding laterally from the elongated spine.

7. The system for mounting the T-bar with speaker of claim 1, further comprising a lower heat sink formed adjacent to the planar shelf.

8. The system for mounting a T-bar with speaker of claim 7, wherein the lower heat sink comprises at least one fin protruding from a top side of the planar shelf on at least one lateral side of the rest shelf separated by the elongated spine.

9. A system for mounting a T-bar with a speaker from a suspended ceiling, the system comprising:
    an elongated spine extending from a first terminal end to a second terminal end, the elongated spine have an upper heat sink formed into the elongated spine;
    a planar shelf forming a lower portion of the elongated spine, the planar shelf extending to both lateral sides of the elongated spine and having a lower heat sink formed into the planar shelf on each lateral side, wherein the planar shelf with the lower heat sink and the elongated spine with the upper heat sink create a constant cross-sectional form of the T-bar;
    a compartment, the compartment located on a bottom side of the planar shelf and containing at least one speaker attached to the bottom side of the planar shelf;
    a power source, the power source connected to the at least one speaker through cabling; and
    an amplifier, the amplifier connected to the at least one speaker through cabling.

10. The system for mounting a T-bar with speaker of claim 9, further comprising at least one fin protruding laterally from at least one side of the elongated spine to form the upper heat sink.

11. The system for mounting a T-bar with speaker of claim 9, further comprising at least one fin protruding from a top side of the planar shelf on at least one lateral side of the planar shelf to form the lower heat sink.

12. The system for mounting a T-bar with speaker of claim 9, wherein the power source and amplifier are located remote from the T-bar with speaker.

13. The system for mounting a T-bar with speaker of claim 9, further comprising a plurality of connectors, each connector located at each terminal end of the elongated spine, the plurality of connectors connectable to either a second T-bar with speaker or a common T-bar used for a suspended ceiling frame.

* * * * *